F. X. MÜLLER.
HOSE COUPLING.
APPLICATION FILED FEB. 26, 1915.
1,215,050.
Patented Feb. 6, 1917.
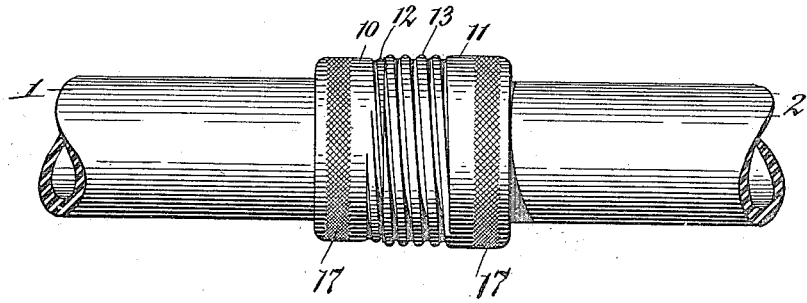
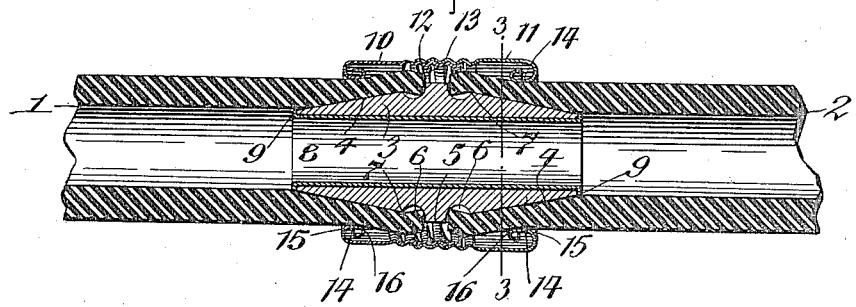
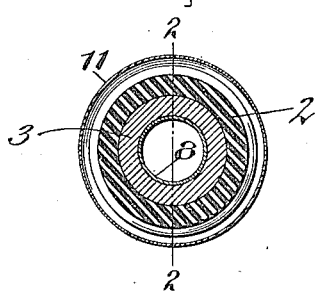
WITNESSES.
Julius J. Prible
W. Ray Taylor
INVENTOR
Frank X. Müller
BY Geyer & Topp
ATTORNEYS.

UNITED STATES PATENT OFFICE.

FRANK X. MÜLLER, OF BUFFALO, NEW YORK, ASSIGNOR TO REPUBLIC HOSE COUPLER CORPORATION, OF BUFFALO, NEW YORK, A CORPORATION OF NEW YORK.

HOSE-COUPLING.

1,215,050.     Specification of Letters Patent.     Patented Feb. 6, 1917.

Application filed February 26, 1915. Serial No. 10,723.

*To all whom it may concern:*

Be it known that I, FRANK X. MÜLLER, a citizen of the United States, residing at Buffalo, in the county of Erie and State of New York, have invented new and useful Improvements in Hose-Couplings, of which the following is a specification.

This invention relates to a hose or tube coupling which is more particularly designed for mending garden hose when the same becomes broken although the same may also be used for connecting new sections of such hose as well as for other purposes.

It is the object of this invention to provide a coupling for this purpose which is very simple and inexpensive in construction, which can be readily operated by the use of the hands only, so that no tools are required for this purpose, which is so constructed that it is light and durable and will not cut or injure the hose and which has its ferrule or core extending from the bore of one hose section to the other provided with a protecting non-absorbent lining so as to prevent such cores when made of wood or other absorbent material from becoming water soaked in the bore and swelling to such an extent as would unduly reduce the capacity of the hose.

In the accompanying drawings: Figure 1 is a side elevation of a hose or tube coupling constructed in accordance with my invention. Fig. 2 is a longitudinal section of the same taken in line 2—2, Fig. 3. Fig. 3 is a cross section taken in line 3—3, Fig. 2.

Similar characters of reference indicate corresponding parts throughout the several views.

1 and 2 represent two sections of a hose or tube which are preferably constructed of flexible or elastic material similar to that usually employed for sprinkling lawns or gardens. Projecting into the opposing ends of the bores of these hose sections and forming a tubular connection between the same is a core or ferrule 3 which is preferably constructed of wood or similar material and having its opposite ends of outwardly tapered or conical form, as shown at 4, 4, so that upon pushing these ends of the ferrule into the bores of the hose sections the latter will be distended or spread apart and therefore produce a tight joint between the ferrule and the hose sections. Midway of the length of this ferrule the same is provided externally with a circumferential or annular flange 5 against which opposite ends of the hose section are adapted to bear for the purpose of centering the coupling ferrule between the same. On opposite sides of this flange the periphery of the ferrule is provided with annular grooves 6, 6 which form comparatively sharp corners or shoulders 7, 7 at the inner or large ends of the conical surfaces of the ferrule. Owing to the ends of the hose sections being distended the extremities of the same after being slipped over the conical surfaces of the ferrule again contract slightly as the same overhang the grooves of the ferrule, thereby causing these extremities to grip the corners 7 of the ferrule and assist in retaining the hose sections on the same.

In the absence of any provision to protect the bore or passageway of the ferrule which is made of wood or other absorbent material, for the sake of economy, the same would become excessively soaked with water and therefore swell unduly so that the passageway would become contracted and reduce the capacity and efficiency of the hose to which the same is applied. To prevent this a protecting tubular lining 8 of sheet metal or other non-absorbent material is placed on the inner side of the ferrule and retained in place in any suitable manner, for instance, by forming outwardly projecting flanges 9 at opposite ends of the lining and engaging the same with opposite ends of the ferrule, as shown in Fig. 2.

Means are also provided for gripping the distended portions of the hose sections against the outer side of the conical portions of the ferrule. These means preferably comprise two coupling sleeves 10, 11 which surround the distended end portions of the hose sections and are provided at their inner opposing ends with complementary male and female screw threads 12, 13, respectively, which work one into the other for the purpose of detachably connecting these sleeves. Each of these coupling sleeves is constructed of sheet metal and its thread is formed thereon either by stamping or rolling in any suitable and well known manner. At its outer end each of the coupling sleeves is provided with an inwardly projecting annular bead 14 which is curled or turned backwardly upon itself within the bore of the sleeve so as to present a rounded surface 15 at the outer side of this bead and also a rounded surface 16 at the inner side of the same in a direction lengthwise of the axis of the sleeve, whereby it is possible to apply this sleeve to the hose section and also remove the same therefrom without liability of cutting or injuring the same. Upon drawing the two coupling sleeves together by tightening the screw connection between the same their clamping beads are drawn toward each other and into engagement with the conically distended end portions of the hose sections whereby the latter are firmly gripped upon the correspondingly shaped ends of the ferrule and a reliable connection is formed between the hose sections which prevents the same from being pulled apart while in use.

The coupling sleeve may be tightened in this manner as well as loosened when necessary without the use of tools, this being possible by merely grasping the two coupling sleeves in both hands and turning the same relatively to each other. In order to enable the hands to obtain a firm hold on these coupling sleeves the peripheries of the same are preferably knurled or roughened, as shown at 17 in Fig. 1.

This tube coupling presents a comparatively smooth exterior and is not much larger in diameter than the hose, so that the same is not only neat and finished in appearance but can also be dragged over the lawn without liability of injuring the same or any shrubbery with which it engages.

Furthermore, by constructing the coupling sleeves in the manner described the cost thereof is materially reduced without sacrificing strength.

I claim as my invention:

A hose coupling comprising a tubular ferrule of absorbent material adapted to be inserted at its opposite ends into the opposing ends of two hose sections, and a non-absorbent lining arranged within the bore of said ferrule and having its ends provided with outwardly projecting integral flanges which engage with the ends of said ferrule and cover the entire surfaces of said ends.

Witness my hand this 24th day of February, 1915.

FRANK X. MÜLLER.

Witnesses:
 GEO. J. WINTER,
 THEO. L. POPP.